No. 851,808. PATENTED APR. 30, 1907.
C. H. HILL.
AUTOMATIC SWITCH FOR ELECTRIC CIRCUITS.
APPLICATION FILED OCT. 22, 1904.
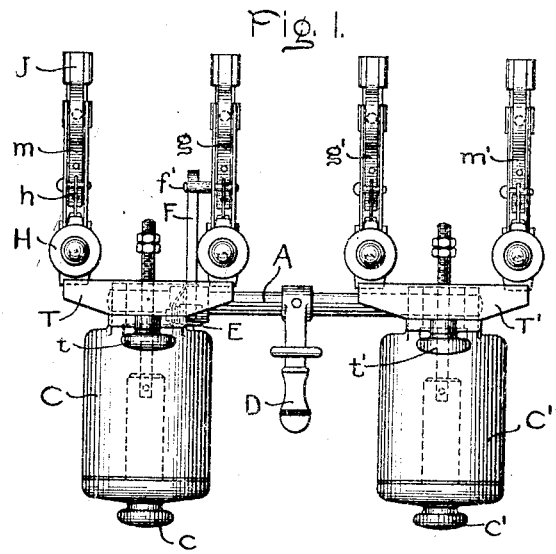
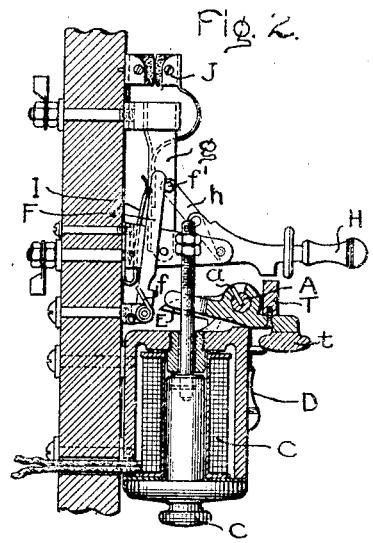
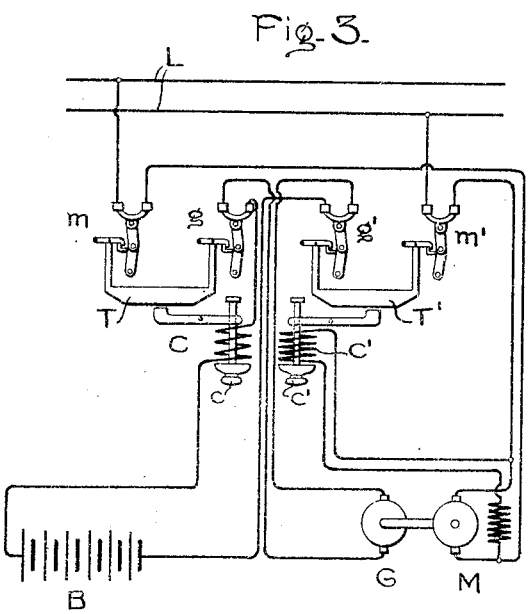
Witnesses.
Inventor:
Charles H. Hill.
by Albert G. Davis
Att'y.

UNITED STATES PATENT OFFICE.

CHARLES H. HILL, OF SCHENECTADY, NEW YORK, ASSIGNOR TO GENERAL ELECTRIC COMPANY, A CORPORATION OF NEW YORK.

AUTOMATIC SWITCH FOR ELECTRIC CIRCUITS.

No. 851,808.        Specification of Letters Patent.        Patented April 30, 1907.

Application filed October 22, 1904. Serial No. 229,563.

*To all whom it may concern:*

Be it known that I, CHARLES H. HILL, a citizen of the United States, residing at Schenectady, in the county of Schenectady and State of New York, have invented certain new and useful Improvements in Automatic Switches for Electric Circuits, of which the following is a specification.

My invention relates to automatic switches for electric circuits, and is particularly applicable to the control of motor-generator sets charging storage batteries. I shall consequently describe my invention as thus applied, but it will be understood that my invention is not necessarily limited to this particular application. In charging storage batteries, it is important that the battery circuit should be opened when the battery is fully charged. I take advantage of the diminution of current-flow, when the battery is fully charged, to open the battery circuit, and I also provide means for opening the circuit of the motor driving the charging generator in case the source of supply for the motor should fail, and thereby prevent the battery from driving the generator as a motor and discharging.

My invention consists in providing a novel, simple and efficient form of automatic switch for accomplishing the results above set forth.

My invention will best be understood by reference to the accompanying drawings, in which Figure 1 shows a front elevation of a switch arranged in accordance with my invention; Fig. 2 shows a side elevation of the same, with one of the controlling magnets in cross-section; and Fig. 3 shows a diagram of connections as applied to the control of a motor-generator set for charging a storage battery.

Referring first to Fig. 3, M represents an electric motor connected through the switches m m' to a suitable source of current, as indicated by the line-wires L. G represents a generator driven by the motor M and connected through the switches g g' to the storage battery B. C C' represent two tripping coils which are connected respectively in circuit with the generator G and in shunt to the motor M, either directly or in series with the shunt field, as shown, and which act respectively as under-load-release and no-voltage-release magnets. The cores c and c' of these tripping coils control respectively the tripping bars T and T'. The tripping bar T controls the two switches m and g, while the tripping bar T' controls the two switches g' and m'. The cores c and c' are normally held raised in the position shown, but if either coil allows its core to fall, it will move one of the tripping bars, and thereby will open one switch in both the motor and generator circuits. When the battery B becomes fully charged and the current in the battery circuit consequently falls due to the increase in battery potential, the coil C will release its core, thereby opening switches m and g, bringing the motor to rest and disconnecting the generator from the battery. Overcharging the battery is thus prevented. In case the supply of current to the motor M should fail, the coil C' will release its core, thereby opening the switches g' and m', disconnecting the motor from the source and the generator from the battery, and preventing the battery from discharging through the generator.

The construction of the switches is shown in Figs. 1 and 2. Each switch is provided with a handle H, as shown in Fig. 2, and it is connected through a link h to the operating blade g. The handle and link h form a toggle which locks the switch-blade in position. I is a spring which tends to open the switch whenever the toggle is moved past its dead center. Each switch-blade is provided with an auxiliary shunt contact J to break the arc on opening the circuit. A represents a shaft rotatably mounted in the top of the casings of the coils C and C'. This shaft has secured to it a handle D, by means of which the shaft may be rocked. Loosely mounted on the shaft are the tripping bars T and T', which are provided with slots adapted to be engaged by pins a on the shaft A, as shown in Fig. 2. The cores of the magnets are shown in their normal position, that is raised, but it will be evident from Fig. 2 that if the core c is released, it will strike the tripping bar T, rocking it so as to engage the handle H and move the toggle joint past its dead center, allowing the spring I to open the switch, Also secured to the shaft A is a hook or dog E which, when the switch-blade g is open, is adapted to engage a notch in the pivoted lever F, which is normally held pressed against a stop f' on the switch-blade g by the spring

*f*. There is only one dog on the shaft A, and only one pivoted lever F, as is evident from Fig. 1.

The operation is as follows: If all the switches are open, and it is desired to start up the motor-generator set to charge the battery, handle D is first pushed inward, rocking shaft A so as to bring the pins *a* into engagement with the tripping bars T and T'. By rocking these tripping bars, the cores *c* and *c'* will be lifted, and the hook or dog E on the shaft A will engage the notch on the pivoted lever F which, since switch *g* is open, is in position to be engaged. This engagement between the dog E and the lever F holds shaft A in the position to which it is moved by the handle D, and locks the tripping bars T and T' so that they cannot be returned by the magnet cores to engage the handles of the switches when the handle D is released. The two outside switches *m* and *m'* are then closed, and the motor-circuit is completed. The core *c'* of the no-voltage-release coil C' is then pushed up into the position shown, where it is held by the coil C'. The voltage of generator G is then adjusted to its proper value, and the switch *g'* closed, thereby closing one leg of the generator circuit. The core *c* of the under-load release coil is then pushed up into the position shown, and the switch *g* is finally closed. By closing this switch, the pivoted lever F is moved out of engagement with the dog E and the tripping bars T and T' are released, and are free to trip the switches when the battery is charged, or if the source of current for the motor fails. The tripping bars are provided with handles *t t'*, by means of which the circuit of the motor and generator may be simultaneously opened by hand at any time.

It will be seen that if the cores of both magnets are not pushed up into position before closing switch *g*, the switches will be immediately tripped. It is thus impossible to leave the switches closed unless the cores of the magnets are in proper position.

I do not desire to limit myself to the particular construction and arrangement of parts here shown, but aim in the appended claims to cover all modifications which are within the scope of my invention.

What I claim as new and desire to secure by Letters Patent of the United States, is,

1. In combination with a motor-generator set, two sets of switches each adapted and arranged to open the circuits of both motor and generator, means for actuating one set on the failure of voltage in the motor-circuit, and means for operating the other set upon a predetermined variation of current in the generator circuit.

2. In combination with a motor-generator set, two sets of switches each adapted to open the circuit of both motor and generator, a tripping magnet for one set connected in shunt circuit to the motor-armature, and a tripping coil for the other set connected in series with the generator armature.

3. In combination with a motor-generator set, two sets of switches each adapted to open the circuit of both motor and generator, a no-voltage-release magnet controlling one set and connected in the motor-circuit, and an under-load-release magnet controlling the other set.

4. In combination with a motor-generator set, two pairs of switches, each being arranged to open one leg of the circuits of both machines, and independent tripping devices for said pairs.

5. In combination with a motor-generator set, four independently-operable switches controlling the circuits of said machines, two in each circuit, two independent tripping devices each controlling one generator and one motor switch, and means for rendering said tripping devices inoperative until the generator switches are closed.

6. In combination with a motor-generator set, four independently-operable switches controlling the circuits of said machines, two in each circuit, two independent tripping devices each controlling one generator and one motor-switch, means for restraining said tripping devices in an inoperative position at starting, and means for releasing said devices upon the closing of a generator switch.

7. In combination with a motor-generator set, four independently-operable switches controlling the circuits of said machines, two in each circuit, two independent tripping devices each controlling one generator and one motor-switch, a latch for restraining said tripping devices in an inoperative position, and operative connections between said latch and one of the generator switches.

8. In combination, two pairs of independently-operable switches, a shaft, two independent tripping devices for said pairs loosely mounted on said shaft, means on said shaft for engaging said devices when said shaft is rocked, a dog on said shaft, a latch adapted to be engaged thereby when said shaft is rocked, and operative connections between said latch and one of said switches.

9. In combination, two pairs of independently-operable switches, two independent tripping devices for said pairs, means for moving said devices to an inoperative position, a latch for said moving means, and operative connections between said latch and one of said switches whereby said devices are released when said switch is closed.

10. In combination with a motor-generator set, a no-voltage-release magnet in the motor-circuit, an under-load-release magnet in the generator circuit, and independent means controlled by said magnets for opening both circuits.

11. In combination, two magnets, a shaft extending above said magnets, two members loosely mounted on said shaft adapted to be engaged respectively by the cores of said magnets, and four independently-operable switches adapted to be tripped two by one of said members and two by the other.

12. In combination, two magnets, a shaft extending above said magnets, two members loosely journaled on said shaft and adapted to be engaged respectively by the cores of said magnets, independently-operable switches adapted to be tripped by said members, means on the shaft for engaging said members when the shaft is rocked, a latch for engaging said shaft when rocked, and operative connections between said latch and one of said switches.

In witness whereof, I have hereunto my hand this 21st day of October, 1904.

CHARLES H. HILL.

Witnesses:
BENJAMIN B. HULL.
HELEN ORFORD.